(12) United States Patent
Medower et al.

(10) Patent No.: US 11,906,628 B2
(45) Date of Patent: Feb. 20, 2024

(54) DEPTH MAPPING USING SPATIAL MULTIPLEXING OF ILLUMINATION PHASE

(71) Applicant: Apple Inc., Cupertino, CA (US)

(72) Inventors: Brian S. Medower, San Jose, CA (US); Bernhard Buettgen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 814 days.

(21) Appl. No.: 16/939,019

(22) Filed: Jul. 26, 2020

(65) Prior Publication Data

US 2021/0048531 A1 Feb. 18, 2021

Related U.S. Application Data

(60) Provisional application No. 62/981,049, filed on Feb. 25, 2020, provisional application No. 62/886,979, filed on Aug. 15, 2019.

(51) Int. Cl.
*G01S 17/894* (2020.01)
*G01S 7/481* (2006.01)
*G01S 17/10* (2020.01)

(52) U.S. Cl.
CPC .......... *G01S 17/894* (2020.01); *G01S 7/4815* (2013.01); *G01S 7/4816* (2013.01); *G01S 7/4817* (2013.01); *G01S 17/10* (2013.01)

(58) Field of Classification Search
CPC .......... G01S 17/10; G01S 17/14; G01S 17/36; G01S 17/89; G01S 17/894; G01S 7/4815;
(Continued)

(56) References Cited

U.S. PATENT DOCUMENTS 4,471,785 A 9/1984 Wilson et al.
7,379,163 B2 5/2008 Rafii et al.
(Continued)

FOREIGN PATENT DOCUMENTS

CN 108141528 A 6/2018
EP 3410486 A1 12/2018
(Continued)

OTHER PUBLICATIONS

U.S. Appl. No. 16/914,513 Office Action dated Oct. 21, 2022.
(Continued)

*Primary Examiner* — Luke D Ratcliffe
(74) *Attorney, Agent, or Firm* — Kligler & Associates Patent Attorneys Ltd.

(57) ABSTRACT

Apparatus for optical sensing includes an illumination assembly, which is configured to direct a first array of beams of optical radiation toward different, respective areas in a target scene while modulating the beams with respective carrier waves having a common carrier frequency and different respective phase angles, which vary across the first array in a predefined spatial pattern. A detection assembly includes a second array of sensing elements, which are configured to output respective signals in response to the optical radiation that is incident on the sensing elements during one or more detection intervals, which are synchronized with the carrier frequency, and objective optics, which are configured to form an image of the target scene on the second array. Processing circuitry processes the signals output by the sensing elements in order to generate a depth map of the target scene.

18 Claims, 5 Drawing Sheets

(58) Field of Classification Search
CPC ...... G01S 7/4816; G01S 7/4817; G01S 7/484; G01S 7/4863; G01S 7/4911; G01S 7/4914

See application file for complete search history.

(56) References Cited

U.S. PATENT DOCUMENTS

| | | | |
|---|---|---|---|
| 7,806,604 B2 | 10/2010 | Bazakos et al. | |
| 8,649,557 B2 | 2/2014 | Hyung et al. | |
| 8,670,021 B2 | 3/2014 | Kuznetsov et al. | |
| 8,989,455 B2 | 3/2015 | Shor et al. | |
| 9,467,633 B2 | 10/2016 | Johnson et al. | |
| 9,565,373 B2 | 2/2017 | Strandemar et al. | |
| 9,723,233 B2 | 8/2017 | Grauer et al. | |
| 9,898,074 B2 | 2/2018 | Shpunt et al. | |
| 10,061,028 B2 | 8/2018 | Koppal et al. | |
| 10,228,240 B2 | 3/2019 | Trail | |
| 10,229,502 B2 | 3/2019 | Adam et al. | |
| 10,274,377 B1 | 4/2019 | Rabb et al. | |
| 10,430,958 B2 | 10/2019 | Akkaya et al. | |
| 10,469,833 B2 | 11/2019 | Hua et al. | |
| 10,605,916 B2 | 3/2020 | Molnar et al. | |
| 10,616,519 B2 | 4/2020 | Elkhatib et al. | |
| 10,762,655 B1 | 9/2020 | Lindskog et al. | |
| 10,878,589 B2 | 12/2020 | Bitan et al. | |
| 10,929,997 B1 | 2/2021 | Hall et al. | |
| 2005/0145773 A1 | 7/2005 | Hashimoto et al. | |
| 2006/0207978 A1 | 9/2006 | Rizun et al. | |
| 2009/0304294 A1 | 12/2009 | Katsumoto et al. | |
| 2010/0008588 A1* | 1/2010 | Feldkhun | G01S 7/499 382/206 |
| 2010/0128960 A1 | 5/2010 | Yumikake | |
| 2013/0329042 A1 | 12/2013 | Murata et al. | |
| 2014/0064555 A1 | 3/2014 | Sebastian et al. | |
| 2015/0253429 A1* | 9/2015 | Dorrington | G01S 17/894 356/5.01 |
| 2016/0109575 A1 | 4/2016 | Oggier et al. | |
| 2016/0119606 A1 | 4/2016 | Horikawa | |
| 2016/0198147 A1 | 7/2016 | Waligorski et al. | |
| 2017/0176579 A1 | 6/2017 | Niclass et al. | |
| 2017/0316602 A1 | 11/2017 | Smirnov et al. | |
| 2018/0067197 A1 | 3/2018 | Schockaert et al. | |
| 2018/0095165 A1 | 4/2018 | Cohen et al. | |
| 2018/0275278 A1 | 9/2018 | Yamada | |
| 2018/0278910 A1 | 9/2018 | Schoenberg et al. | |
| 2018/0366504 A1 | 12/2018 | Jin | |
| 2019/0004156 A1 | 1/2019 | Niclass et al. | |
| 2019/0011562 A1 | 1/2019 | Pacala et al. | |
| 2019/0011567 A1 | 1/2019 | Pacala et al. | |
| 2019/0181169 A1 | 6/2019 | Tadmor et al. | |
| 2019/0195991 A1 | 6/2019 | Miki et al. | |
| 2019/0208118 A1 | 7/2019 | Jasinski | |
| 2019/0219696 A1* | 7/2019 | Xu | G01S 7/4915 |
| 2019/0303551 A1 | 10/2019 | Tussy | |
| 2019/0331776 A1 | 10/2019 | Aotake et al. | |
| 2019/0361532 A1 | 11/2019 | Sun et al. | |
| 2019/0363520 A1 | 11/2019 | Laflaquiere et al. | |
| 2020/0057151 A1 | 2/2020 | Finkelstein et al. | |
| 2020/0195909 A1 | 6/2020 | Shintani | |
| 2020/0314376 A1 | 10/2020 | Kim et al. | |

FOREIGN PATENT DOCUMENTS

| | | |
|---|---|---|
| EP | 3474038 A1 | 4/2019 |
| KR | 20190000052 A | 1/2019 |
| WO | 2018218298 A1 | 12/2018 |

OTHER PUBLICATIONS

International Application # PCT/US2020/040040 Search Report dated Aug. 24, 2020.
U.S. Appl. No. 17/324,144 Office Action dated Jun. 3, 2022.
U.S. Appl. No. 16/914,513 Office Action dated Jul. 5, 2022.
Oggier et al., U.S. Appl. No. 16/914,513, filed Jun. 29, 2020.
International Application # PCT/US2020/043645 Search Report dated Oct. 20, 2020.
International Application # PCT/US2021/033049 Search Report dated Sep. 8, 2021.
Naik et al., "A Light Transport Model for Mitigating Multipath Interference in Time-of-Flight Sensors", 2015 IEEE Conference on Computer Vision and Pattern Recognition (CVPR), pp. 1-9, Jun. 7-12, 2015.
Nayar et al., "Fast Separation of Direct and Global Components of a Scene using High Frequency Illumination", ACM Transactions in Graphics, vol. 23, issue 3, pp. 935-944, Jul. 2006.
Payne et al., "Multiple Frequency Range Imaging to Remove Measurement Ambiguity", Proceedings of 9th Conference on Optical 3-D Measurement Techniques, pp. 139-148, Jul. 1-3, 2009.
U.S. Appl. No. 17/200,832 Office Action dated Mar. 28, 2023.

* cited by examiner

DEPTH MAPPING USING SPATIAL MULTIPLEXING OF ILLUMINATION PHASE

CROSS-REFERENCE TO RELATED APPLICATIONS

This application claims the benefit of U.S. Provisional Patent Application 62/886,979, filed Aug. 15, 2019, and of U.S. Provisional Patent Application 62/981,049, filed Feb. 25, 2020. Both of these related applications are incorporated herein by reference.

FIELD OF THE INVENTION

The present invention relates generally to depth mapping, and particularly to methods and apparatus for depth mapping using indirect time of flight techniques.

BACKGROUND

Various methods are known in the art for optical depth mapping, i.e., generating a three-dimensional (3D) profile of the surface of an object by processing an optical image of the object. This sort of 3D profile is also referred to as a 3D map, depth map or depth image, and depth mapping is also referred to as 3D mapping. (In the context of the present description and in the claims, the terms "optical radiation" and "light" are used interchangeably to refer to electromagnetic radiation in any of the visible, infrared and ultraviolet ranges of the spectrum.)

Some depth mapping systems operate by measuring the time of flight (TOF) of radiation to and from points in a target scene. In direct TOF (dTOF) systems, a light transmitter, such as a laser or array of lasers, directs short pulses of light toward the scene. A receiver, such as a sensitive, high-speed photodiode (for example, an avalanche photodiode) or an array of such photodiodes, receives the light returned from the scene. Processing circuitry measures the time delay between the transmitted and received light pulses at each point in the scene, which is indicative of the distance traveled by the light beam, and hence of the depth of the object at the point, and uses the depth data thus extracted in producing a 3D map of the scene Indirect TOF (iTOF) systems, on the other hand, operate by modulating the amplitude of an outgoing beam of radiation at a certain carrier frequency, and then measuring the phase shift of that carrier wave in the radiation that is reflected back from the target scene. The phase shift can be measured by imaging the scene onto an optical sensor array, and acquiring demodulation phase bins in synchronization with the modulation of the outgoing beam. The phase shift of the reflected radiation received from each point in the scene is indicative of the distance traveled by the radiation to and from that point, although the measurement may be ambiguous due to range-folding of the phase of the carrier wave over distance.

SUMMARY

Embodiments of the present invention that are described hereinbelow provide improved apparatus and methods for depth mapping.

There is therefore provided, in accordance with an embodiment of the invention, apparatus for optical sensing, including an illumination assembly, which is configured to direct a first array of beams of optical radiation toward different, respective areas in a target scene while modulating the beams with respective carrier waves having a common carrier frequency and different respective phase angles, which vary across the first array in a predefined spatial pattern. A detection assembly is configured to receive the optical radiation that is reflected from the target scene, and includes a second array of sensing elements, which are configured to output respective signals in response to the optical radiation that is incident on the sensing elements during one or more detection intervals, which are synchronized with the carrier frequency, and objective optics, which are configured to form an image of the target scene on the second array. Processing circuitry is configured to process the signals output by the sensing elements in order to generate a depth map of the target scene.

In some embodiments, the predefined spatial pattern includes a grid pattern. In another embodiment, the predefined spatial pattern includes parallel stripes. Alternatively, the predefined spatial pattern includes an irregular variation of the respective phase angles across the first array. Further alternatively or additionally, the predefined spatial pattern includes a quasi-continuous pattern.

In some embodiments, the objective optics are configured to form the image of the target scene on the second array such that the respective areas in the target scene that are irradiated by the beams having the different respective phase angles are imaged onto corresponding sets of one or more of the sensing elements, and the processing circuitry is configured to process the signals output by the corresponding sets of the sensing elements responsively to the spatial pattern of the varying phase angles of the carrier waves in order to compute depth coordinates of points in the target scene. In one embodiment, the beams include sequences of pulses of the optical radiation, and the signals output by the sensing elements are indicative of respective times of flight of the pulses, and the processing circuitry is configured to process the times of flight together with the different respective phase angles of the beams in computing the depth coordinates. Alternatively or additionally, the detection intervals of the sensing elements occur in multiple different, respective detection phases over the second array, and the processing circuitry is configured to apply both the different phase angles of the beams of the optical radiation and the different detection phases of the sensing elements in computing the depth coordinates.

In further embodiments, the first array of beams includes multiple sets of the beams, which are mutually adjacent in the first array and are directed toward different, respective points in the target scene, and which have in each set, the different, respective phase angles, and the objective optics are configured to form the image of the target scene on the second array such that clusters of the points in the target scene that are irradiated by respective sets of the beams are imaged onto corresponding groups of the sensing elements, and the processing circuitry is configured to process the signals output by the sensing elements in the corresponding groups in order to compute depth coordinates of the points in the clusters.

In some of these embodiments, each cluster of the points includes four points that are illuminated respectively by four beams having four different, respective phase angles and are imaged onto a respective group of at least four different sensing elements. In one such embodiment, the illumination assembly includes four matrices of beam sources, wherein each of the four matrices is configured to generate the beams with a different one of the four phase angles, and projection optics, which are configured to direct the beams toward the target scene while interleaving the beams from the four matrices to form the sets of the beams having the different respective phase angles. In a disclosed embodiment, the projection optics include a diffractive optical element.

In yet another embodiment, the illumination assembly is configured to modulate the beams with the carrier waves at different, first and second common carrier frequencies, and the processing circuitry is configured to receive and process the signals output by the sensing elements in at least first and second detection intervals, which are respectively synchronized with the first and second common carrier frequencies.

There is also provided, in accordance with an embodiment of the invention, apparatus for optical sensing, including an illumination assembly, which is configured to direct a first array of beams of optical radiation toward different, respective areas in a target scene while modulating the beams with respective carrier waves having different respective carrier frequencies, which vary across the first array in a predefined spatial pattern. A detection assembly is configured to receive the optical radiation that is reflected from the target scene, and includes a second array of sensing elements and objective optics, which are configured to form an image of the target scene on the second array, such that the respective areas in the target scene that are irradiated by the beams having the different respective carrier frequencies are imaged onto corresponding sets of one or more of the sensing elements. The sensing elements in the corresponding sets are configured to output respective signals in response to the optical radiation that is incident on the sensing elements during one or more detection intervals, which are synchronized with the respective carrier frequencies of the beams that are incident on the respective areas in the target scene. Processing circuitry is configured to process the signals output by the sensing elements in the corresponding sets in order to generate a depth map of the target scene.

There is additionally provided, in accordance with an embodiment of the invention, a method for optical sensing, which includes directing a first array of beams of optical radiation toward different, respective areas in a target scene while modulating the beams with respective carrier waves having a common carrier frequency and different respective phase angles, which vary across the first array in a predefined spatial pattern. An image of the target scene is formed on a second array of sensing elements, which output respective signals in response to the optical radiation that is incident on the sensing elements during one or more detection intervals, which are synchronized with the carrier frequency. The signals output by the sensing elements are processed in order to generate a depth map of the target scene.

The present invention will be more fully understood from the following detailed description of the embodiments thereof, taken together with the drawings in which:

DETAILED DESCRIPTION OF EMBODIMENTS

Overview

Figure 1:
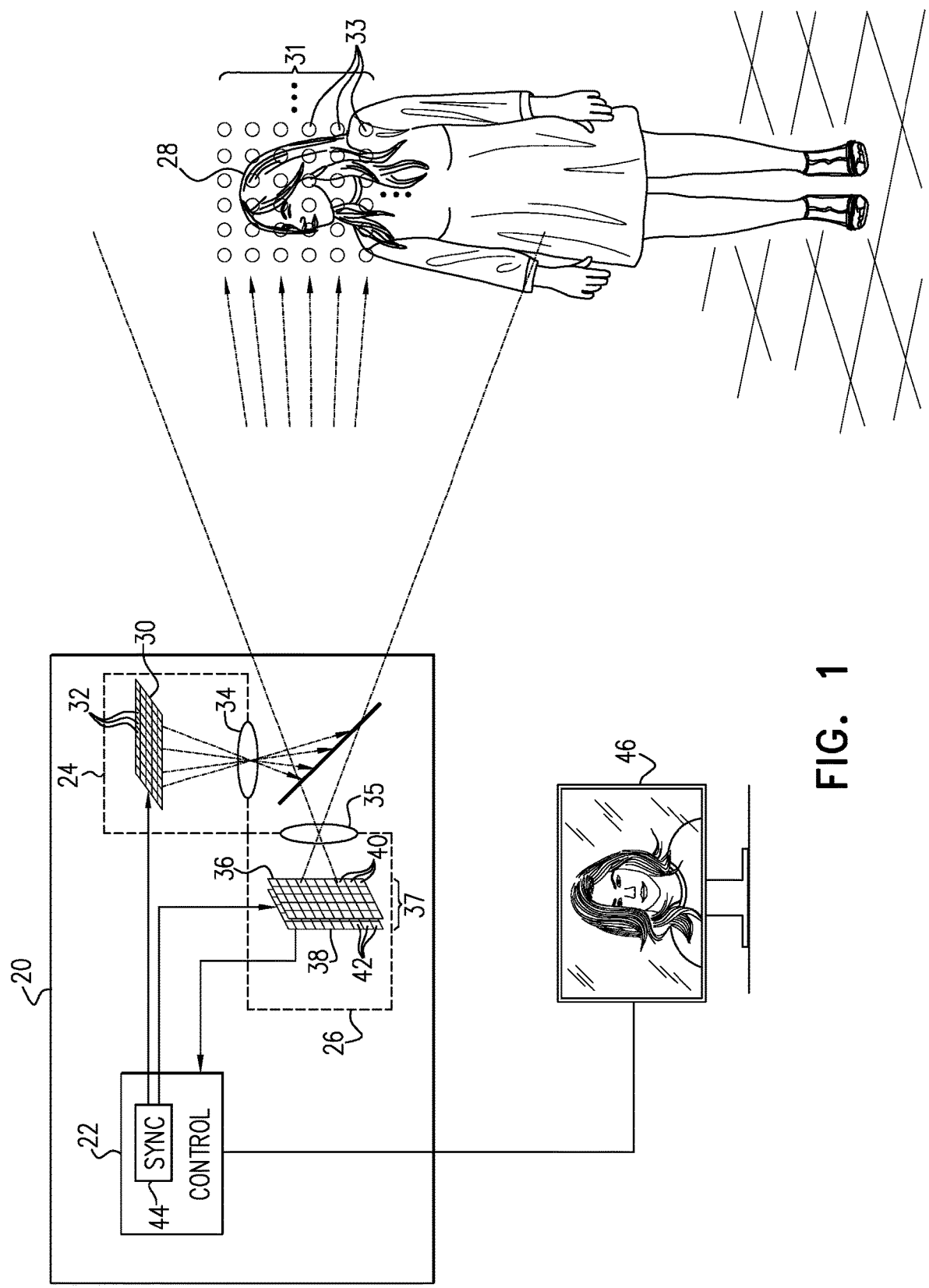
FIG. 1 is a block diagram that schematically illustrates a depth mapping apparatus, in accordance with an embodiment of the invention.

Optical indirect TOF (iTOF) systems that are known in the art use multiple different acquisition phases in the receiver in order to measure the phase shift of the carrier wave in the light that is reflected from at each point in the target scene. For this purpose, many iTOF systems use special-purpose image sensing arrays, in which each sensing element is designed to demodulate the transmitted modulation signal individually to receive and integrate light during a respective phase of the cycle of the carrier wave. At least three different demodulation phases are needed in order to measure the phase shift of the carrier wave in the received light relative to the transmitted beam. For practical reasons, most systems acquire light during four distinct demodulation phases.

In a typical image sensing array of this sort, the sensing elements are arranged in clusters of four sensing elements (also referred to as "pixels"), in which each sensing element accumulates received light over at least one phase of the modulation signal, and commonly over two phases that are 180 degree separated. The phases of the sensing elements are shifted relative to the carrier frequency, for example at 0°, 90°, 180° and 270°. A processing circuit combines the respective signals from the four pixels (referred to as $I_0$, $I_{90}$, $I_{180}$ and $I_{270}$, respectively) to extract a depth value, which is proportional to the function $\tan^{-1}[(I_{270}-I_{90})/(I_0-I_{180})]$. The constant of proportionality and maximal depth range depend on the choice of carrier wave frequency.

Other iTOF systems use smaller clusters of sensing elements, for example pairs of sensing elements that acquire received light in phases 180° apart, or even arrays of sensing elements that all share the same detection interval. In such cases, the synchronization of the detection intervals of the entire array of sensing elements is shifted relative to the carrier wave of the transmitted beam over successive acquisition frames in order to acquire sufficient information to measure the phase shift of the carrier wave in the received light relative to the transmitted beam. The processing circuit then combines the pixel values over two or more successive image frames in order to compute the depth coordinate for each point in the scene.

In iTOF systems that are known in the art, the light that illuminates the target scene is typically modulated with the same carrier wave across the entire scene. Embodiments of the present invention that are described herein take a different approach to the problem of image acquisition in an iTOF signal: Spatial modulation of the carrier wave that is used in temporal modulation of the optical radiation that illuminates the target scene. In some embodiments, the phase of the carrier wave is spatially modulated, meaning that the phase of the carrier wave that temporally modulates the illumination also varies over the scene. Alternatively or additionally, the frequency of the carrier wave may be spatially modulated in similar fashion.

Thus, in some embodiments of the present invention, an illumination assembly directs an array of beams of optical radiation toward different, respective areas in the target scene. The beams are modulated with respective carrier waves having a common carrier frequency but different respective phase angles, which vary across the array in a predefined spatial pattern. Objective optics form an image of the target scene on an array of sensing elements, which output respective signals in response to the optical radiation that is incident on the sensing elements during one or more detection intervals, which are synchronized with the carrier frequency. Specifically, each area in the target scene that is irradiated by a beam having a certain phase angle is imaged onto a corresponding set of one or more of the sensing elements. Processing circuitry processes the signals output by the sets of the sensing elements, while taking the spatial pattern of the varying phase angles of the carrier waves into account, in order to generate a depth map of the scene.

In some embodiments, the spatial pattern of modulation of the carrier phase creates sets of multiple, mutually adjacent illumination beams with different, respective phase angles, directed toward different, respective points in the target scene. For example, in each set of four adjacent beams in the array, the carrier waves modulating the beams may be synchronized at four different phase angles, such as 0°, 90°, 180° and 270°. Thus, the modulation of the optical radiation reflected from the corresponding cluster of points in the target scene, which are irradiated respectively by these beams, is similarly offset in phase.

In this case, the objective optics image the target scene onto the array of sensing elements such that each of these clusters of points in the target scene, which is irradiated by a corresponding set of the illumination beams, is imaged onto a corresponding group of the sensing elements. The signals output by each such group of sensing elements will thus represent different phase relations between the respective phases of the carrier waves modulating the illumination beams in the set and the detection intervals of the sensing elements. The processing circuitry processes the signals output by the sensing elements in the corresponding groups in order to compute depth coordinates of the points in the clusters in the target scene.

This sort of carrier-phase-modulated illumination pattern enables the detection assembly, which receives the optical radiation that is reflected from the target scene, to gather sufficient information in a single image frame in order to compute a depth map over the entire scene, without having to apply different, phased sensing intervals across the array of sensing elements. Rather, in each image frame, the sensing elements output respective signals in response to the incident optical radiation during a certain detection interval, which is synchronized with the carrier frequency. This detection interval can be the same over all of the sensing elements in the array, since the phase differentiation is provided by the beams that illuminate the scene. (Alternatively, the detection intervals of the sensing elements may occur in multiple different, respective detection phases and frequencies over the array, which can be useful in disambiguation of range folding.)

Furthermore, spatial modulation of the phase angle of the carrier wave has other advantages over approaches that are known in the art, in which the carrier phase is uniform over the entire illumination field:

Mitigation of multi-path interference—When the light received by a given sensing element in the iTOF sensing array includes stray reflections of the illuminating beams, the difference in the optical path length of these reflections relative to direct reflections from the target scene can cause a phase error in the measurement made by that sensing element. This phase error will lead to errors in computing the depth coordinates of points in the scene. When the carrier phase is spatially modulated, however, the phases of stray reflections from different points will tend to cancel out, thus canceling the phase error.

Reduction of peak illumination power—Due to spatial modulation of the carrier phase, different beams will be projected at their respective peak intensity levels at different times, and the variations in illumination power from the entire array of beams will thus be averaged out. Therefore, for a given peak beam intensity level (chosen, for example, in order to achieve a certain signal/noise level at the sensing array), the total peak illumination power over the entire array of beams will be substantially lower than it would be if all the beams were to be modulated in phase.

Enhanced security—When the target scene is illuminated with a unique pattern of spatial modulation of the carrier phase, the processing circuitry will expect to see this same pattern reflected in the signals output by the sensing array and can apply the pattern in filtering out spurious measurements. This sort of filtering is effective both in reducing interference due to other modulated illumination sources in the vicinity of the depth mapping apparatus, and in preventing errors that may occur due to malicious attempts at interfering with depth measurements.

These latter advantages apply regardless of the detection scheme that is implemented in the sensing array and processing circuitry. Therefore, in other embodiments, spatial modulation of the carrier wave phase angles can be used in conjunction with other iTOF detection and processing approaches, which do not necessarily require sets of multiple, mutually adjacent illumination beams with different, respective phase angles, directed toward different, respective points in the target scene, which are imaged onto corresponding groups of sensing elements. Rather, the spatial modulation of the carrier phase can be used advantageously in conjunction with types of iTOF sensing arrays that are known in the art, in which the detection phases of the sensing elements vary over the array and/or vary over successive acquisition frames.

In an alternative embodiment, similar advantages are achieved by modulating the illumination beams with respective carrier waves having different, respective carrier frequencies, which vary across the array of beams in a predefined spatial pattern. In this case, the detection intervals of the sensing elements are synchronized with the respective carrier frequencies of the beams that are incident on the respective areas in the target scene that are imaged onto the sensing elements. This sort of modulation of the carrier frequency can be used instead of or in conjunction with modulation of the carrier phase. In either case, the processing circuitry processes the signals that are output by sets of the sensing elements in order to generate a depth map of the target scene.

System Description

FIG. 1 is a block diagram that schematically illustrates a depth mapping apparatus 20, in accordance with an embodiment of the invention. Apparatus 20 comprises an illumination assembly 24 and a detection assembly 26, under control of processing circuitry 22. In the pictured embodiment, the illumination and detection assemblies are boresighted, and thus share the same optical axis outside apparatus 20, without parallax; but alternatively, other optical configurations may be used. For example, in a non-boresighted configuration, pattern recognition techniques may be used to detect and cancel out the effects of parallax.

Figure 3:
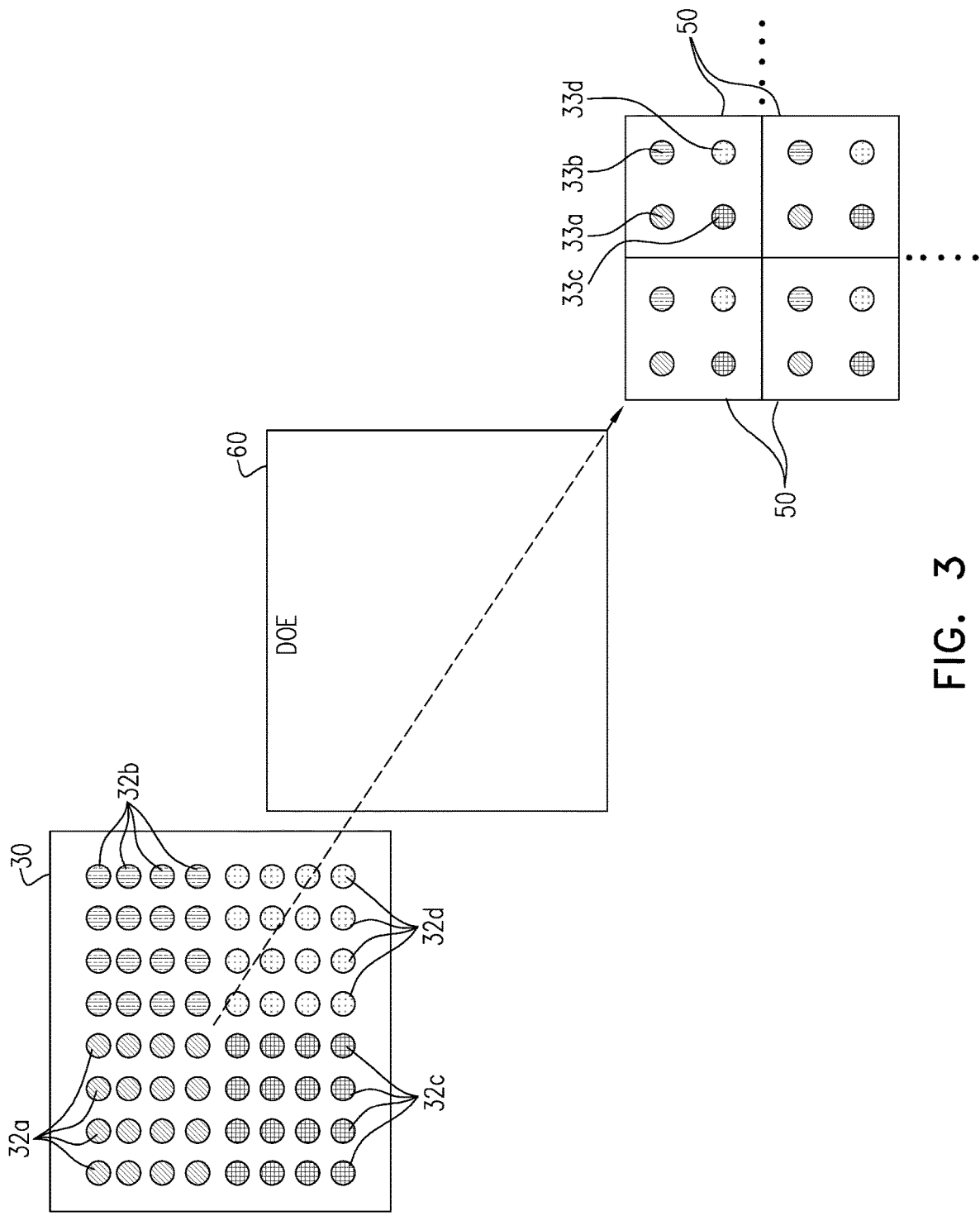
FIG. 3 is a block diagram that schematically illustrates an illumination assembly used in a depth mapping apparatus, in accordance with an embodiment of the invention.

Illumination assembly 24 comprises an array 30 of beam sources 32, for example suitable semiconductor emitters, such as semiconductor lasers or light-emitting diodes (LEDs), which emit an array of respective beams of optical radiation toward different, respective points in a target scene 28 (in this case containing a human subject). Typically, beam sources 32 emit infrared radiation, but alternatively, radiation in other parts of the optical spectrum may be used. The beams are typically collimated by projection optics 34, and thus form a corresponding array 31 of spots 33 extending across the area of interest in scene 28. Projection optics 34 typically comprise one or more refractive elements, such as lenses, and may alternatively or additionally comprise one or more diffractive optical elements (DOEs), for example as shown in FIG. 3.

A synchronization circuit 44 modulates the amplitudes of the beams that are output by sources 32 with respective carrier waves having a common carrier frequency and different respective phase angles. For example, the carrier frequency may be 300 MHz, meaning that the carrier wavelength (when applied to the beams output by array 30) is about 1 m, which also determines the effective range of apparatus 20. (Beyond this range, depth measurements may be ambiguous due to range folding.) Alternatively, higher or lower carrier frequencies may be used, depending, inter alia, on range and resolution requirements. Furthermore, two or more different carrier frequencies may be interleaved, with detection intervals of detection assembly 26 synchronized with the different carrier frequencies, in order to extend the ambiguity range of the apparatus. In alternative embodiments, the resulting spatial modulation of carrier frequencies may be used in addition to or instead of the modulation of the carrier phases of the beams.

The amplitudes of the beams output by sources 32 are modulated at different, respective phase angles, which vary across the array of beams in a predefined spatial pattern. For example, the successive beams along each row of array 30 may be modulated at four different phase angles of 0°, 90°, 180° and 270°, repeating periodically along the row. The radiation incident in spots 33 is similarly modulated in phase and frequency. The spatial phase patterns in successive rows may be offset so that each 2×2 cluster of spots 33 includes one spot at each of the four different phase angles. Alternatively, synchronization circuit 44 may apply other phase patterns, which may include application of a larger or smaller number of different phases to the beams in the array.

Figure 4:
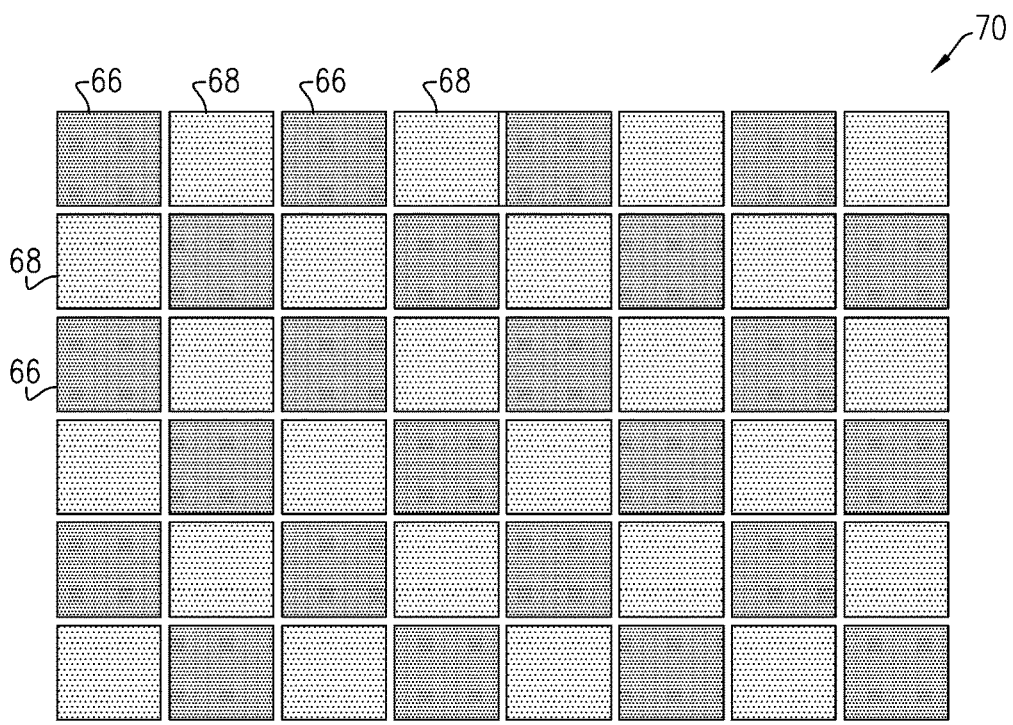
FIGS. 4, 5 and 6 are schematic representation of spatial modulation patterns used in a depth mapping apparatus, in accordance with alternative embodiments of the invention.
Figure 5:
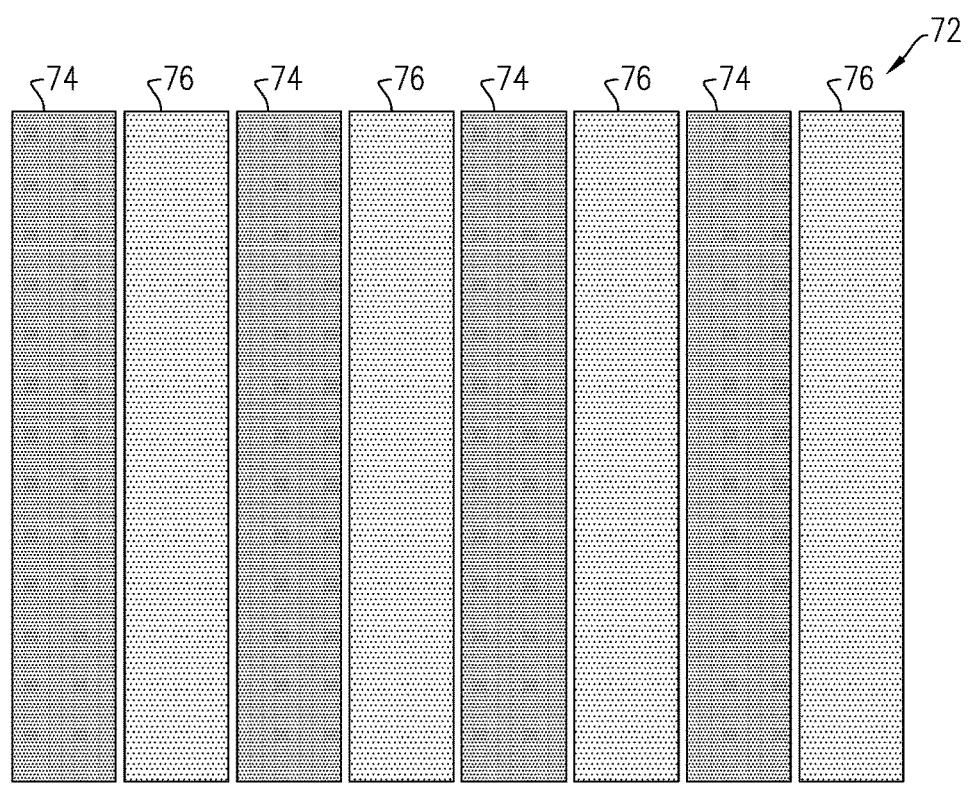
Figure 6:
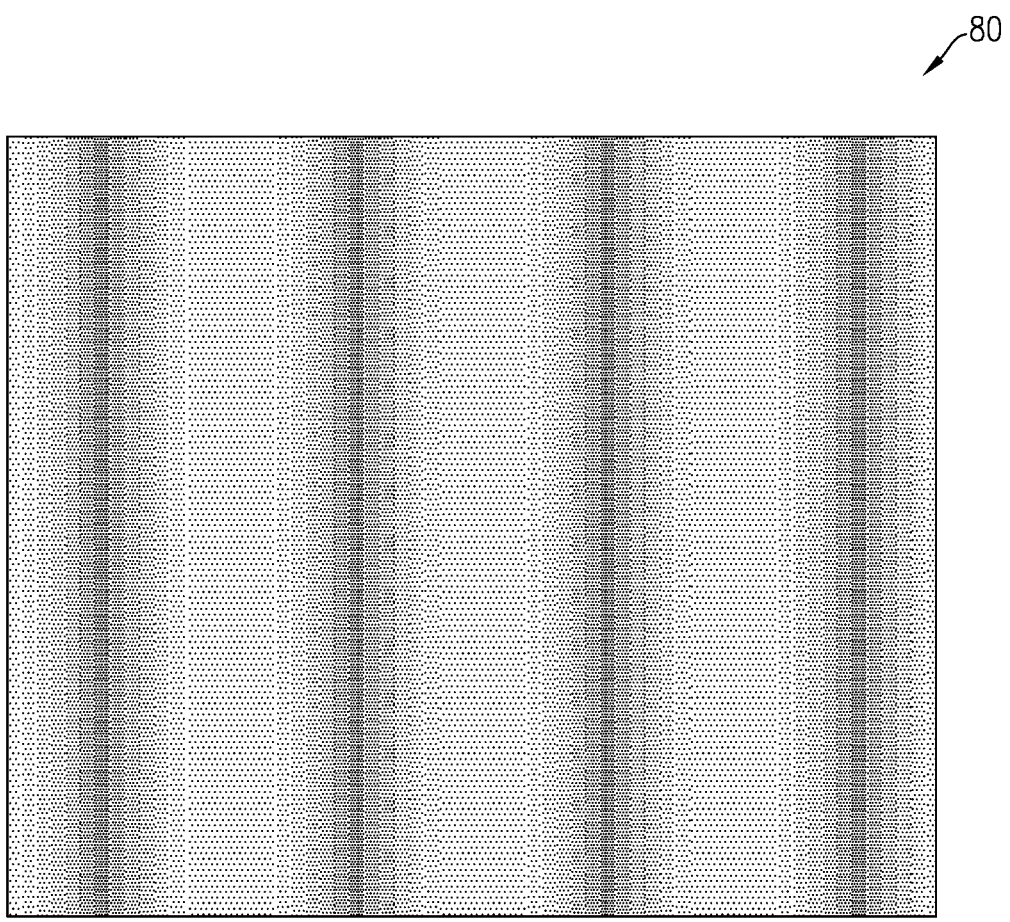

In alternative embodiments, illumination assembly 24 may comprise other sorts of beam sources 32 and apply different sorts of modulation patterns to the beams. Some examples of alternative modulation patterns are shown in FIGS. 4-6. In one embodiment, array 30 comprises an extended radiation source, whose output is spatially and temporally modulated by a high-speed, pixelated spatial light modulator (SLM) to generate the beams (so that the pixels of the SLM serve as the beam sources). As another example, beam sources 32 may comprise lasers, such as vertical-cavity surface-emitting lasers (VCSELs), which emit short pulses of radiation. In this case, synchronization circuit 44 modulates the beams by controlling the relative times of emission of the pulses by the beam sources in accordance with the desired spatial phase pattern.

Detection assembly 26 receives the optical radiation that is reflected from target scene 28 (and specifically from spots 33) via objective optics 35. The objective optics form an image of the target scene on an array 36 of sensing elements 40, such as photodiodes, in a suitable image sensor 37. Sensing elements 40 are connected to a corresponding array 38 of pixel circuits 42, which demodulate the signal from the optical radiation that is focused onto array 36. Typically, although not necessarily, image sensor 37 comprises a single integrated circuit device, in which sensing elements 40 and pixel circuits 42 are integrated.

Figure 2:
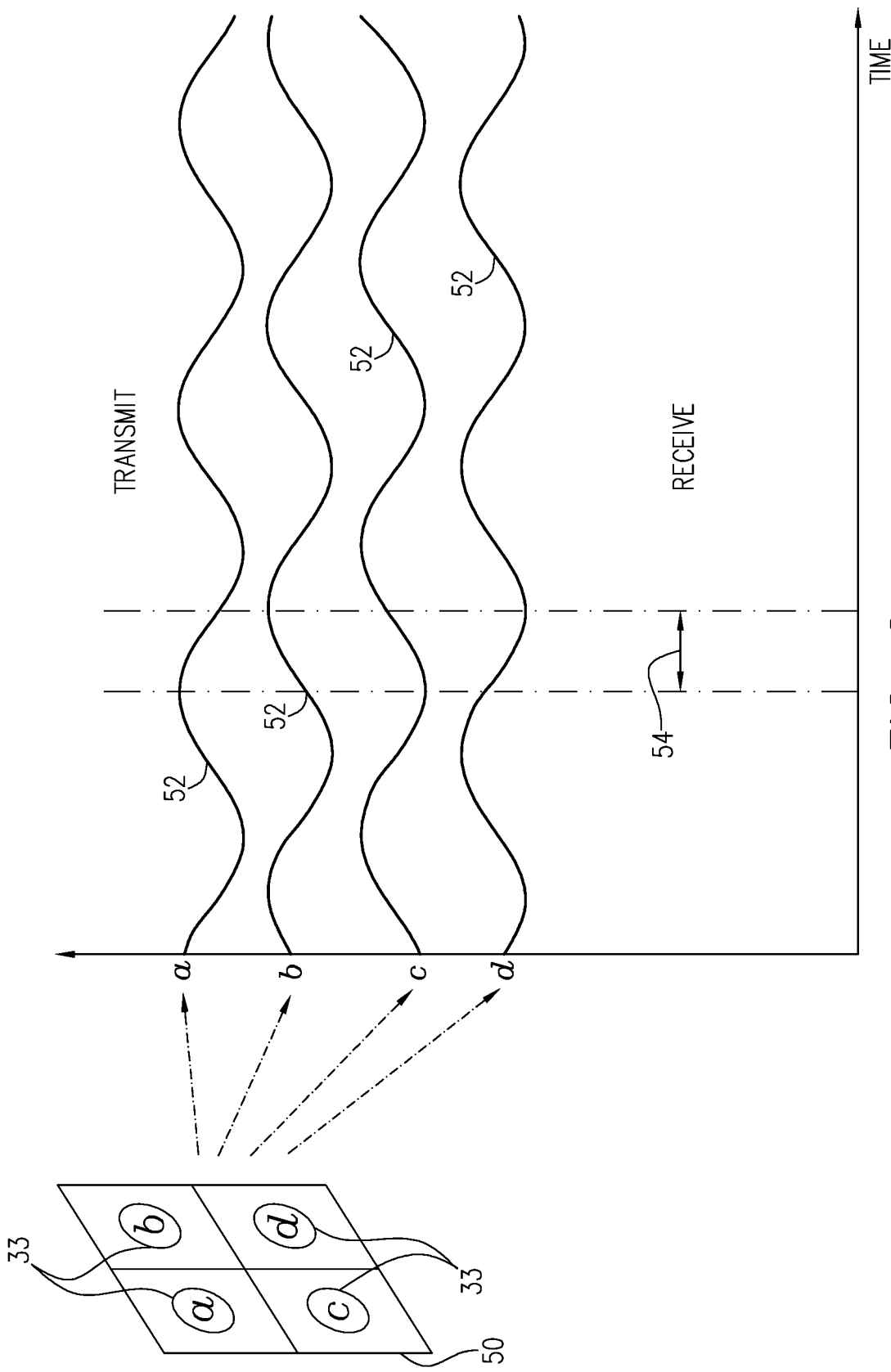
FIG. 2 is a plot that schematically illustrates modulation waveforms used in a depth mapping apparatus, in accordance with an embodiment of the invention.

Synchronization circuit 44 controls pixel circuits 42 so that sensing elements 40 output respective signals in response to the optical radiation that is incident on the sensing elements only during certain detection intervals, which are synchronized with the carrier frequency that is applied to beam sources 32. For example, pixel circuits 42 may apply a suitable electronic shutter to sensing elements 40, in synchronization with the carrier frequency. Because the beams emitted by beam sources 32 have different, respective carrier phases, the detection intervals applied by pixel circuits 42 to sensing elements may be the same over all of the sensing elements in array 36 (for example as illustrated in FIG. 2). Alternatively, pixel circuits 42 may comprise switches and charge stores that may be controlled individually to select different detection intervals at different phases relative to the carrier frequency.

Objective optics form an image of target scene 28 on array 36 such that each spot 33 cast by a corresponding beam onto the target scene is imaged onto a set of one or more sensing elements 40, which may comprise a single sensing element or possibly a number of mutually-adjacent sensing elements. Each cluster of points in the target scene, which are irradiated by corresponding spots 33 cast by sets of the beams having different phase angles, is thus imaged onto a corresponding group of the sensing elements. As illustrated in FIG. 1, illumination assembly 24 and detection assembly are mutually aligned, and may be pre-calibrated, as well, so that processing circuitry 22 is able to identify the correspondence between spots 33, with their respective phases, and sensing elements 40. The processing circuitry can then process the signals output by the sensing elements in the corresponding groups, as demodulated by pixel circuits 42, in order to compute depth coordinates of the points in the clusters in the target scene. Processing circuitry 22 may then output a depth map to a display 46 and/or may save the depth map in a memory for further processing.

Processing circuitry 22 typically comprises a general- or special-purpose microprocessor or digital signal processor, which is programmed in software or firmware to carry out the functions that are described herein. The processing circuitry also includes suitable digital and analog peripheral circuits and interfaces, including synchronization circuit 44, for outputting control signals to and receiving inputs from the other elements of apparatus 20. The detailed design of such circuits will be apparent to those skilled in the art of depth mapping devices after reading the present description.

FIG. 2 is a plot that schematically illustrates modulation waveforms 52 used in apparatus 20, in accordance with an embodiment of the invention. An inset at the left of the figure shows a cluster 50 of four adjacent spots 33 that are projected onto scene 28, labeled 33*a*, 33*b*, 33*c* and 33*d*. Each spot contains optical radiation, emitted by illumination assembly 24, which is modulated by a respective carrier waveform 52. These waveforms have the same carrier frequency but have different, respective phases, which are 90° apart.

All of sensing elements 40 in image sensor 37 are controlled by pixel circuits 42 to integrate radiation in certain detection intervals, for example a detection interval 54, with a duration of one quarter-wave at the frequency of waveforms 52, as shown in FIG. 2. In consequence, the sensing elements onto which spots 33*a*, 33*b*, 33*c* and 33*d* are imaged will output phase-synchronized signals $I_0$, $I_{90}$, $I_{180}$ and $I_{270}$, respectively, corresponding to the phase offset of interval 54 relative to waveforms 52 for each sensing element. Processing circuitry 22 can then extract a depth value for cluster 50 using the function $\tan^{-1}[(I_{270}-I_{90})/(I_0-I_{180})]$, as explained above. Although only a single detection interval 54 is shown in FIG. 2 for the sake of simplicity, typically the detection intervals are repeated periodically, in any suitable phase relationship to waveforms 52.

The distribution of waveforms 52 in FIG. 2 illustrates additional advantages of this sort of spatially-modulated phase pattern. The total intensity of illumination emitted from assembly 24 (FIG. 1) will be a sum of the individual intensities of waveforms 52; and because the waveforms are out of phase with one another, the sum will be roughly uniform and will not have strong peaks as it would if the waveforms were in phase. Furthermore, to the extent that stray reflections of the beams are incident on a given sensing element 40, the phases of the corresponding waveforms 52 will tend to cancel out, thus reducing phase error in the demodulated signals received from the sensing elements, which might otherwise lead to errors in computation of the depth coordinates. This cancellation of phase errors due to stray reflections applies to both multi-path reflections from the target scene and to short-path diffuse reflections from surfaces within apparatus 20.

In alternative embodiments, as noted earlier, more complex demodulation schemes can be applied by pixel circuits 42, so that the detection intervals of sensing elements 40 occur in multiple, different detection phases and frequencies. In this case, the phase-synchronized signals defined above can be extracted on the basis of the variations in the temporal demodulation of the detection intervals (among neighboring pixel circuits and/or in successive image frames). In one such embodiment, processing circuitry 22 applies both the different modulation frequencies of the beams of the optical radiation and the different detection phases of the sensing elements in computing the depth coordinates. By appropriate choice of the frequencies, the processing circuitry will thus be able to resolve the ambiguity of detection due to range folding and can extend the effective range of the depth map.

As noted earlier, beam sources 32 may alternatively emit short pulses of radiation at different emission times in accordance with the phase pattern of waveforms 52. In this case, sensing elements 40 may comprise single-photon detectors, such as single-photon avalanche diodes (SPADs), whose outputs are indicative of respective times of flight of the pulses that are reflected from scene 28. In this case, too, pixel circuits 42 demodulate at the sensing intervals of the detectors, for example by changing the bias voltages so as to gate the sensitivity of the SPADs, in accordance with the timing scheme illustrated by detection interval 54. Processing circuitry 22 can then process the different intensities measured at the different detection phase angles, and possibly the times of flight, as well, in order to compute the depth coordinates.

Illumination Patterns

FIG. 3 is a block diagram that schematically shows details of illumination assembly 24, in accordance with an embodiment of the invention. In this case, array 30 of beam sources 32 comprises four matrices of emitters, labeled 32*a*, 32*b*, 32*c* and 32*d*, which generate respective beams with different carrier phase angles, as illustrated in FIG. 2. For example, emitters 32*a*, 32*b*, 32*c* and 32*d* may comprise laser diodes or LEDs, which are formed together on a common semiconductor substrate. In one embodiment, emitters 32*a*, 32*b*, 32*c* and 32*d* comprise individually-addressable VCSELs, which may be integrated with drive circuits on the same substrate. The division of the emitters into separate matrices simplifies the electrical drive connections that must be made on the substrate. Alternatively, however, emitters 32*a*, 32*b*, 32*c* and 32*d* may be arranged in alternating rows, for example, or in any other suitable layout.

Projection optics 34 in this case comprise a DOE 60, which is designed to direct the beams output by emitters 32*a*, 32*b*, 32*c* and 32*d* toward target scene 28, while interleaving the beams from the four matrices. In other words, the DOE deflects the beams from each matrix at a slightly different angle, so that the beams are interleaved in the far field. As a result, the beams that are incident on the target are arranged in sets of beams with different respective carrier phase angles, casting clusters 50 of spots 33*a*, 33*b*, 33*c* and 33*d* on the target scene with different carrier phase angles, as described above.

FIG. 4 is a schematic representation of a spatial modulation pattern 70 that can be applied by illumination assembly 24 in depth mapping apparatus 20, in accordance with an alternative embodiment of the invention. Pattern 70 comprises a grid of beams 66, 68 that are modulated with respective carrier waves having different, respective phase angles. For example, the modulation of beams 66 may be 180° out of phase with that of beams 68. In this case, pixel circuits 42 will also vary the phases of the demodulation signals of sensing elements 40 in order to collect the phase-synchronized signals $I_0$, $I_{90}$, $I_{180}$ and $I_{270}$, for the purpose of computing the depth coordinates. To the extent that pixel circuits 42 are not controlled in a spatial phase pattern that matches the grid of spatial modulation pattern 70, processing circuitry 22 will take the grid pattern into account as necessary in order to compensate for the carrier phase difference between adjacent beams 66, 68 in generating a depth map of the target scene.

Alternatively, the beams in the grid pattern may have four different carrier phases, as in the pattern shown in FIGS. 2 and 3. In this case, as explained above, pixel circuits 42 may apply the same demodulation phase pattern to all of sensing elements 40, or may apply a different pattern, with phase compensation carried out by post-processing circuitry (not shown). Alternatively, for finer spatial resolution or extended range, the pixel circuits may apply different demodulation times to the sensing elements.

FIG. 5 is a schematic representation of a spatial modulation pattern 72 that can be applied by illumination assembly 24 in depth mapping apparatus 20, in accordance with yet another embodiment of the invention. In this case, pattern 80 comprises beams having the form of parallel stripes 74, 76, which are modulated with respective carrier waves having different, respective phase angles. For example, the modulation of stripes 74 may be 180° out of phase with that of stripes 76. In this case, too, pixel circuits 42 may vary the demodulation times of sensing elements 40 in order to collect the phase-synchronized signals $I_0$, $I_{90}$, $I_{180}$ and $I_{270}$, and processing circuitry 22 will take the stripe pattern into account as necessary in compensating for the carrier phase differences.

In an alternative embodiment, the array of beams in pattern 70 or pattern 72 may be modulated with an irregular variation of the phase angles of the carrier wave. The variation is "irregular" in the sense that the phase differences between adjacent beams are not periodic over the array. An example of this sort of irregular pattern is a pseudo-random pattern.

FIG. 6 is a schematic representation of a spatial modulation pattern 80 that can be applied by illumination assembly 24 in depth mapping apparatus 20, in accordance with still another embodiment of the invention. In this case, the spatial pattern of carrier phase is quasi-continuous, for example with the phase varying sinusoidally. Other spatial patterns may alternatively be used and are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for optical sensing, comprising:
   an illumination assembly, which is configured to direct multiple sets of beams of optical radiation toward different, respective areas in a target scene while modulating the beams with respective carrier waves having a common carrier frequency, each set comprising a group of mutually adjacent beams, which are modulated simultaneously at different respective phase angles in a predefined spatial pattern and which are incident on a corresponding cluster of points in the target scene;
   a detection assembly, which is configured to receive the optical radiation that is reflected from the target scene, and comprises:
      an array of sensing elements, which are configured to output respective signals in response to the optical radiation that is incident on the sensing elements during one or more detection intervals, which are synchronized with the carrier frequency; and
      objective optics, which are configured to form an image of the target scene on the array such that clusters of the points in the target scene that are illuminated by respective sets of the beams are imaged onto corresponding groups of the sensing elements, whereby the signals output by the different sensing elements in each of the groups represent the different respective phases of the carrier waves used in modulating the adjacent beams; and
   processing circuitry, which is configured to combine the signals output by the sensing elements in each of the groups in order to generate a depth map of the target scene.

2. The apparatus according to claim 1, wherein the predefined spatial pattern comprises a grid pattern.

3. The apparatus according to claim 1, wherein the predefined spatial pattern comprises parallel stripes.

4. The apparatus according to claim 1, wherein the predefined spatial pattern comprises an irregular variation of the respective phase angles across the first array.

5. The apparatus according to claim 1, wherein the predefined spatial pattern comprises a quasi-continuous pattern.

6. The apparatus according to claim 1, wherein the objective optics are configured to form the image of the target scene on the array such that the respective areas in the target scene that are irradiated by the beams having the different respective phase angles are imaged onto corresponding sets of one or more of the sensing elements, and wherein the processing circuitry is configured to process the signals output by the corresponding sets of the sensing elements responsively to the spatial pattern of the varying phase angles of the carrier waves in order to compute depth coordinates of points in the target scene.

7. The apparatus according to claim 6, wherein the beams comprise sequences of pulses of the optical radiation, and wherein the signals output by the sensing elements are indicative of respective times of flight of the pulses, and wherein the processing circuitry is configured to process the times of flight together with the different respective phase angles of the beams in computing the depth coordinates.

8. The apparatus according to claim 6, wherein the detection intervals of the sensing elements occur in multiple different, respective detection phases over the array, and wherein the processing circuitry is configured to apply both the different phase angles of the beams of the optical radiation and the different detection phases of the sensing elements in computing the depth coordinates.

9. The apparatus according to claim 1, wherein all the sensing elements output the respective signals in response to the optical radiation that is incident on the sensing elements during one detection interval.

10. The apparatus according to claim 1, wherein each cluster of the points includes four points that are illuminated respectively by four beams having four different, respective phase angles and are imaged onto a respective group of at least four different sensing elements.

11. The apparatus according to claim 10, wherein the illumination assembly comprises:
    four matrices of beam sources, wherein each of the four matrices is configured to generate the beams with a different one of the four phase angles; and
    projection optics, which are configured to direct the beams toward the target scene while interleaving the beams from the four matrices to form the sets of the beams having the different respective phase angles.

12. The apparatus according to claim 11, wherein the projection optics comprise a diffractive optical element.

13. The apparatus according to claim 1, wherein the common carrier frequency is a first common carrier frequency, and wherein the illumination assembly is further configured to modulate the beams with the carrier waves at a second common carrier frequency, different from the first common carrier frequency, and the processing circuitry is configured to receive and process the signals output by the sensing elements in at least first and second detection intervals, which are respectively synchronized with the first and second common carrier frequencies.

14. A method for optical sensing, comprising:
    directing multiple sets of beams of optical radiation toward different, respective areas in a target scene while modulating the beams with respective carrier waves having a common carrier frequency, each set comprising a group of mutually adjacent beams, which are modulated simultaneously at different respective phase angles in a predefined spatial pattern and which are incident on a corresponding cluster of points in the target scene;
    forming an image of the target scene on an array of sensing elements, which output respective signals in response to the optical radiation that is incident on the sensing elements during one or more detection intervals, which are synchronized with the carrier frequency, such that clusters of the points in the target scene that are illuminated by respective sets of the beams are imaged onto corresponding groups of the sensing elements, whereby the signals output by the different sensing elements in each of the groups represent the different respective phases of the carrier waves used in modulating the adjacent beams; and processing the signals output by the sensing elements by combining the signals output by the sensing elements in each of the groups in order to generate a depth map of the target scene.

15. The method according to claim 14, wherein the predefined spatial pattern is selected from a group of patterns consisting of a grid pattern, parallel stripes, an irregular variation of the respective phase angles across the first array, and a quasi-continuous pattern.

16. The method according to claim 14, wherein the image of the target scene is formed on the array such that the respective areas in the target scene that are irradiated by the beams having the different respective phase angles are imaged onto corresponding sets of one or more of the sensing elements, and wherein the signals output by the corresponding sets of the sensing elements are processed responsively to the spatial pattern of the varying phase angles of the carrier waves in order to compute depth coordinates of points in the target scene.

17. The method according to claim 16, wherein directing the multiple sets of beams comprise directing sequences of pulses of the optical radiation toward the target scene, and wherein the signals output by the sensing elements are indicative of respective times of flight of the pulses, and wherein processing the signals comprises applying the times of flight together with the different respective phase angles of the beams in computing the depth coordinates.

18. The method according to claim 14, wherein the common carrier frequency is a first common carrier frequency, and wherein the beams are further modulated with the carrier waves at a second common carrier frequency, different from the first common carrier frequency, and wherein processing the signals comprises receiving and processing the signals output by the sensing elements in at least first and second detection intervals, which are respectively synchronized with the first and second common carrier frequencies.

* * * * *